(12) United States Patent
Wada et al.

(10) Patent No.: US 7,133,223 B2
(45) Date of Patent: Nov. 7, 2006

(54) OPTICAL ELEMENT, METHOD OF MOLDING OPTICAL ELEMENT, AND MOLD

(75) Inventors: Kazuhiro Wada, Hachioji (JP); Hiroyuki Hattori, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 10/973,370

(22) Filed: Oct. 26, 2004

(65) Prior Publication Data

US 2005/0094294 A1 May 5, 2005

(30) Foreign Application Priority Data

Oct. 31, 2003 (JP) ............... 2003-371903

(51) Int. Cl.
*G02B 3/08* (2006.01)
(52) U.S. Cl. .................. 359/811; 359/742; 359/819
(58) Field of Classification Search ............... 359/742, 359/819, 820, 811
See application file for complete search history.

(56) References Cited

U.S. PATENT DOCUMENTS 4,936,666 A * 6/1990 Futhey .................. 359/573

6,914,724 B1 * 7/2005 Redmond ............... 359/619

FOREIGN PATENT DOCUMENTS

JP 2002-200652 7/2002
JP 2002-200654 7/2002

* cited by examiner

*Primary Examiner*—Hung Xuan Dang
*Assistant Examiner*—Joseph Martinez
(74) *Attorney, Agent, or Firm*—Cohen, Pontani, Lieberman & Pavane

(57) ABSTRACT

This invention provides an optical element comprising: an optical functional section on a first surface of the optical element, the optical functional section having a fine structure; and a flange section formed on a periphery of the optical functional section, wherein the flange section has a heat shrinkage-inhibiting portion, which inhibits heat shrinkage of the optical element during molding in a direction perpendicular to an optical axis of the optical element. The invention further provides a method of molding the optical element, and a mold.

10 Claims, 9 Drawing Sheets

FIG. 1A
FIG. 1B
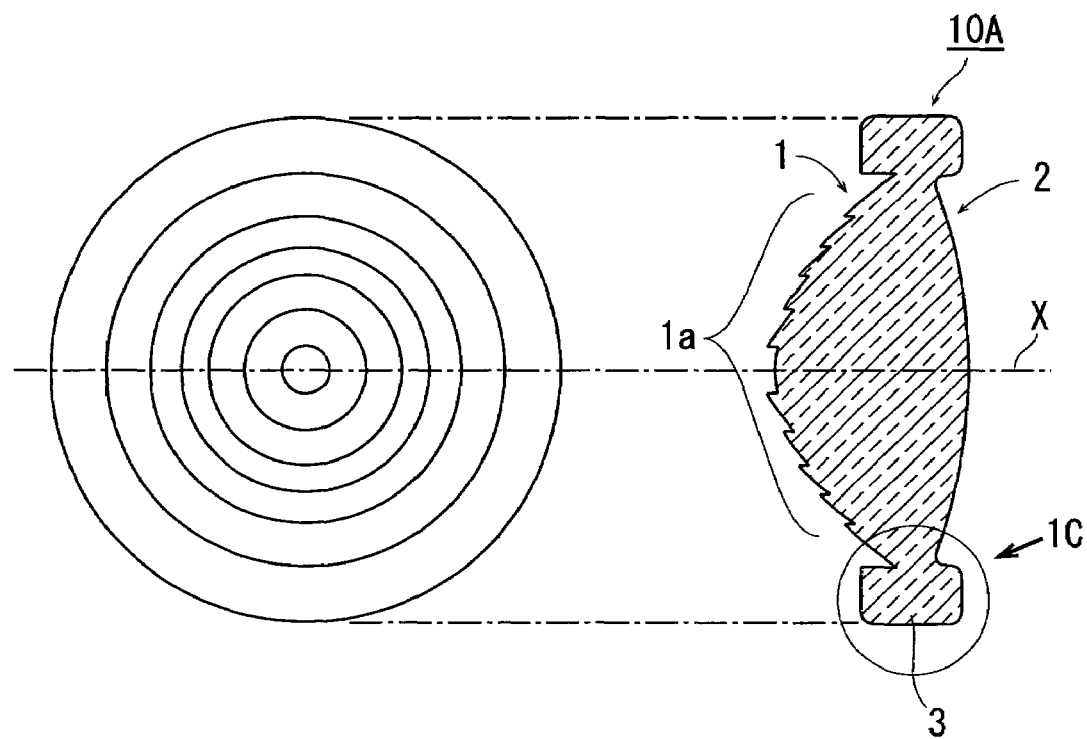
FIG. 1C
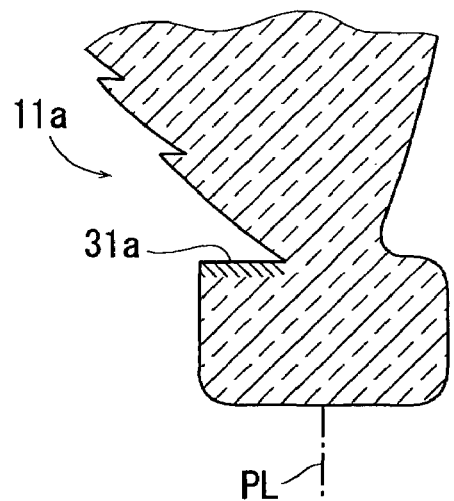

FIG. 5A
FIG. 5B
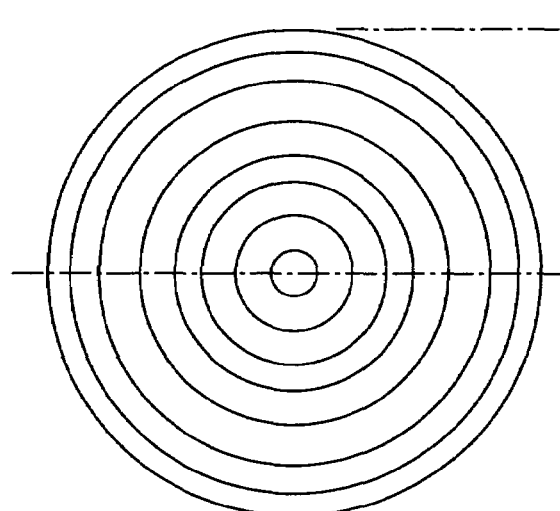
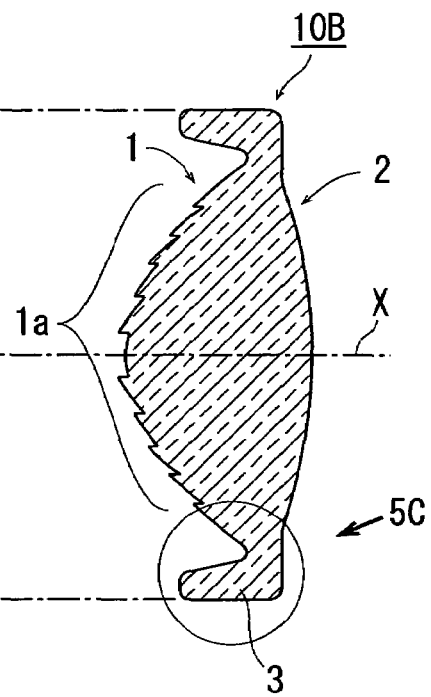
FIG. 5C
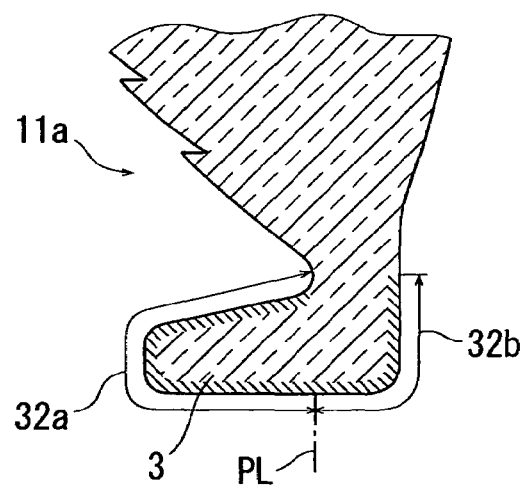

FIG. 6A
FIG. 6B
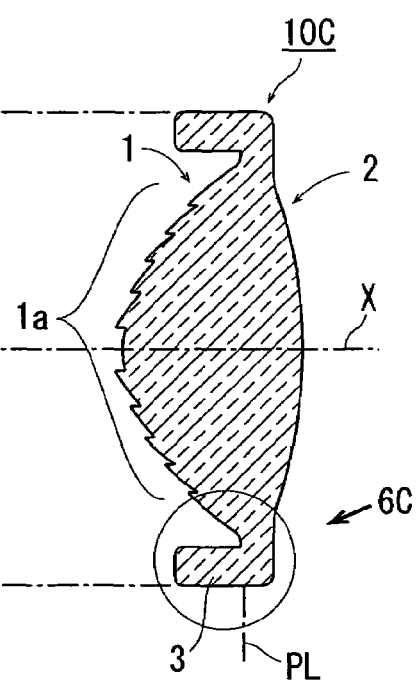
FIG. 6C
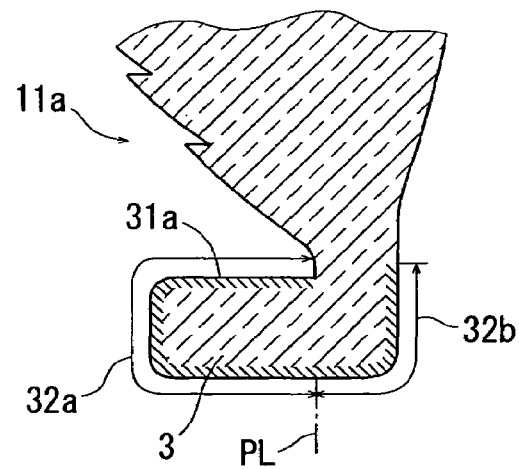

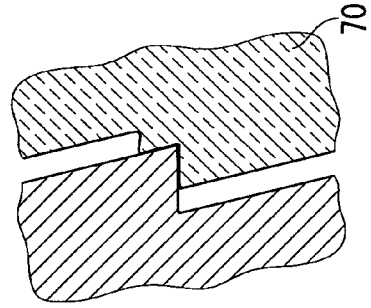
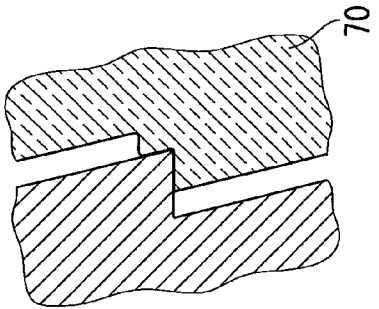
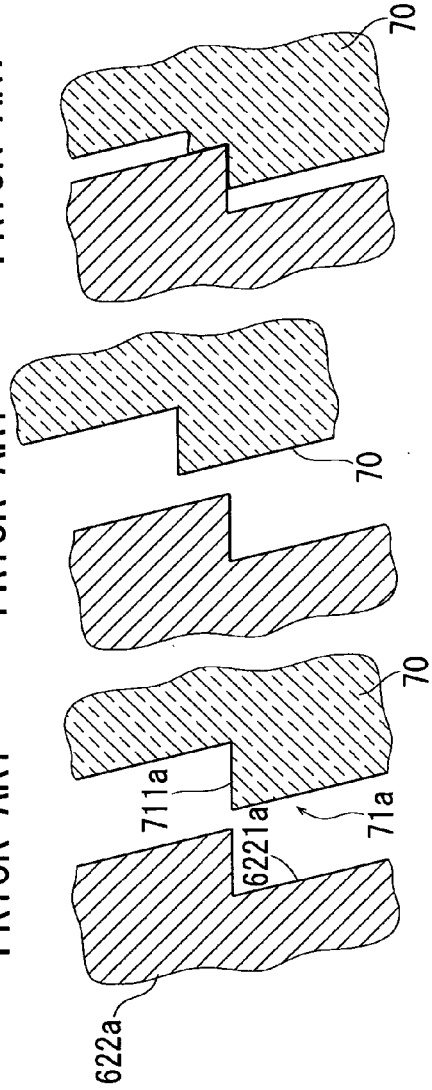
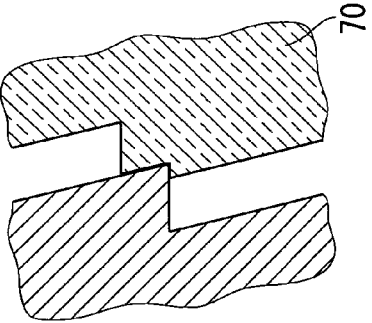
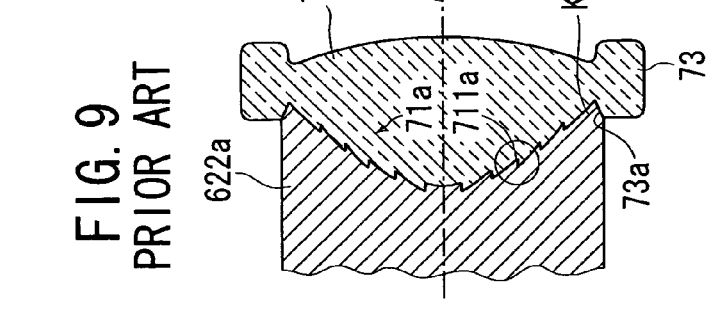
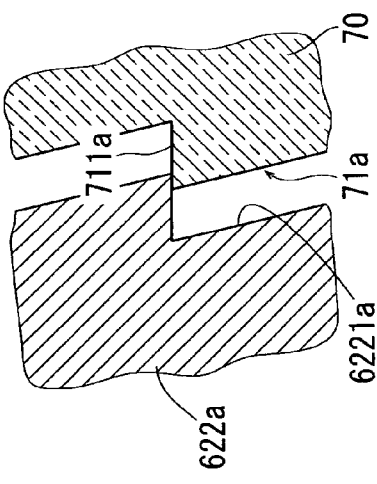

OPTICAL ELEMENT, METHOD OF MOLDING OPTICAL ELEMENT, AND MOLD

This application is based on and claims priority under 35 U.S.C. §119 from the Japanese Patent Application No. 2003-371903 filed in Japan on Oct. 31, 2003, at least entire content is incorporated herein by reference.

TECHNOLOGICAL FIELD

The present invention relates to an optical element, method of molding an optical element, and mold and, more particularly, to an optical element formed by molding and having at least on its one surface an optical functional surface and a flange section at a peripheral portion of the optical functional section, a method of molding an optical element, and a mold.

TECHNOLOGICAL BACKGROUND

Conventionally, an optical element is known having at least on its one surface an optical functional section and a flange section on the periphery of the optical functional section. The optical functional section is molded by the optical functional section forming portion of a movable mold member. A portion corresponding to the optical functional section is ejected from a mold, to push out the optical element from the mold.

As a mold structure for such an optical element, a mold in which the mold surface (the optical functional section forming portion of a movable mold member) of a male mold corresponding to the optical functional section is formed on a movable mold is available. In that mold, when the mold is opened, the optical element is left on the movable mold as the molded product. Further, an ejecting mechanism for the optical element is formed on the movable mold. In the structure, the end face of the ejecting mechanism is the mold surface (the optical functional section forming portion of the movable mold member) corresponding to the surface of the optical functional section. When the optical element is to be released from the movable mold, the molded product is reliably pushed out through the surface of the optical functional section. Incidentally, a melted molding material flows through a pouring gate (sprue), sprue runner (runner), and then injection port (gate) into a molded product space (cavity) (for example, see Japanese Unexamined Patent Publication No. 2002-200652 as Patent reference 1 and Japanese Unexamined Patent Publication No. 2002-200654 as Patent reference 2).

An example of an optical element will be described in detail with reference to the accompanying drawings. FIGS. 8A to 8C are a front view, optical-axis sectional view, and enlarged optical-axis sectional view of the flange section, respectively, of a conventional optical element. Referring to FIGS. 8A to 8C, an optical element 70 is a positive lens as a molded product. The optical element 70 includes an object-side surface 71 having an optical functional section 71a with a fine structure 711a (see FIG. 8C), an image-side surface 72 having an aspherical optical functional section, and a flange section 73 having an inclined portion 73a on its periphery. The object-side surface 71 is formed with a movable mold member, and the image-side surface 72 is formed with a fixed mold member.

The conventional optical element, however, has the following problems.

(1) To form a molded product (optical element), a melted molding material flows through a pouring gate (sprue) sprue runner (runner), and then injection port (gate) into a molded product space (cavity). The material is cut at the gate to obtain a molded product. The mold is opened apart into a movable mold member and fixed mold member. Generally, the molded product (optical element) is left in the movable mold integrally with the sprue, runner, and gate. When the mold is to be opened, if a small gap is formed between the molded product and movable mold member, the formed optical functional section 71a shrinks thermally. With the thermally shrunk optical functional section being present, if the molded product is ejected through that mold surface (the optical functional section forming portion of the movable mold member) of the movable mold member which corresponds to the optical functional section, as the mold surface and the surface shape of the thermally shrunk optical functional section 71a do not coincide, the thermally shrunk optical functional section 71a is deformed by the mold surface. In particular, if the fine structure 711a including a plurality of ring-shape zones with fine steps is to be formed on the surface of the optical functional section 71a, the fine structure cannot be reproduced with high accuracy.

Factors that may hinder the fine structure 711a from being reproduced with high accuracy will be described with reference to the accompanying drawings. FIG. 9 is a partial sectional view showing the optical element 70 in a molded state. A male mold 622a of the movable mold member is in contact with the optical element 70 as a molded product through the fine structure 711a of the optical functional section 71a as a boundary.

FIGS. 10A to 10C and 11A to 11C are schematic views showing a forming process for the fine structure 711a shown in FIG. 9. FIGS. 10A to 10C show a case wherein the gap between the mold surface (the forming portion of the movable mold member which corresponds to the optical functional section) corresponding to the optical functional section 71a and the fine structure 711a is large, and FIGS. 11A to 11C show a case wherein the gap between the mold surface corresponding to the optical functional section 71a and the fine structure 711a is small.

The case wherein the gap between a mold surface 6221a and the fine structure 711a of the optical functional section 71a is large will be described with reference to FIGS. 10A to 10C. Assume that the molded product is left on the movable mold member side but a gap is formed between the mold surface 6221a and the fine structure 711a of the optical functional section 71a (see FIG. 10A). The molded product shrinks thermally by cooling in a direction perpendicular to the optical axis (see FIG. 10B). It is estimated that if the optical functional section 71a is ejected with the mold surface 6221a, as the mold surface 6221a and the surface shape of the thermally shrunk optical functional section do not coincide, the mold surface 6221a may deform (flatten the edge of) the thermally shrunk optical functional section 71a (see FIG. 10C).

The case wherein the gap between the mold surface 6221a and the fine structure 711a of the optical functional section 71a is small will be described with reference to FIGS. 11A to 11C. Assume that the molded product is left on the movable mold member side but a small gap is formed between the mold surface 6221a and the fine structure 711a of the optical functional section 71a (see FIG. 11A). The molded product shrinks thermally by cooling in a direction perpendicular to the optical axis (see FIG. 11B). It is estimated that if the optical functional section 71a is ejected with the mold surface 6221a, as the mold surface 6221a and the surface shape of the thermally shrunk optical functional section do not coincide, the optical functional section 71a may deform to a shape shown in FIG. 11B and a shape shown in FIG. 11C depending on the mold surface 6221*a*.

Regardless of whether a gap is present between the mold surface 6221*a* corresponding to the optical functional section 71*a* and the fine structure 711*a*, the angle formed by the inclined portion 73*a* of the flange section 73 of the molded product and an optical axis X is large. Thus, when the optical element 70 thermally shrinks after molding, the inclined portion 73*a* shrinks without being inhibited by a mold surface K of the flange section of the male mold 622*a*.

(2) The molded product is opened apart into the movable mold member and fixed mold member. Generally, the molded product (optical element) is left in the movable mold member integrally with the sprue, runner, and gate. Assume that a separation force with which that portion of the optical element 70 after the gate which is formed with the movable mold member is released from the movable mold member is determined as F1 and that a separation force with which that portion of the optical element 70 after the gate which is formed with the fixed mold member is released from the fixed mold member is determined as F2. F1 and F2 tend to vary in accordance with variations in molding temperature, molding pressure, and the like. Generally, although the molded product (optical element) is left in the movable mold member integrally with the sprue, runner, and gate, it is not necessarily uniformly left in the movable mold member, and is not always in tight contact with the movable mold member.

SUMMARY OF THE INVENTION

The present invention has been made in view of the above problems, and has as its object to obtain, when molding an optical element, an optical element in which the fine structure of the optical functional section is reproduced with high accuracy without deforming the formed optical functional section with the mold surface.

In order to achieve the above object, as a first aspect of the present invention, there is provided an optical element comprising: an optical functional section on a first surface of the optical element, the optical functional section having a fine structure; and a flange section formed around a periphery of the optical functional section. In the optical element of the first aspect, the flange section has a heat shrinkage-inhibiting portion, which inhibits heat shrinkage of the optical element during molding in a direction perpendicular to an optical axis of the optical element.

As a second aspect of the present invention, there is provided a method of molding an optical element, which includes an optical functional section on a first surface of the optical element and a flange section formed around a periphery of the optical functional section, the optical functional section having a fine structure.

In the optical element of the second aspect, the method comprising the steps of:

filling a mold including a first mold member corresponding to the first surface of the optical element and a second mold member corresponding to a second surface opposite to the first surface, with a melted optical element material;

solidifying the filled optical element material;

opening the mold to separate the first mold member and the second mold member relatively apart from each other, wherein the solidified optical element material is left on the first mold member; and releasing the optical element material from the first mold member by ejecting with an ejecting portion formed on a portion of the first mold member, the ejecting portion corresponding to the optical functional section of the optical element. Further, in the method, the flange section of the optical element has a heat shrinkage-inhibiting portion, which inhibits heat shrinkage in a direction perpendicular to an optical axis of the optical element during at least one of the steps of solidifying, opening, and releasing.

As a third aspect of the present invention, there is provided a mold for molding an optical element, which includes an optical functional section on a first surface of the optical element and a flange section formed around a periphery of the optical functional section, the optical functional section having a fine structure. The mold of the third aspect comprises: a first mold member to form a first surface of the optical element, the first surface having the optical functional section; and a second mold member which forms a second surface opposite to the first surface. Further, in the mold, the flange section has a heat shrinkage-inhibiting portion, which inhibits heat shrinkage during molding in a direction perpendicular to an optical axis of the optical element.

As a fourth aspect of the present invention, the following optical element is provided as a preferable aspect of the optical element of the first aspect. The optical element is molded with a mold including a first mold member, which forms the first surface of the optical element, and a second mold member, which forms a second surface opposite to the first surface. Further, in the optical element of the forth aspect, the flange section has a structure so that F1 is larger than F2, where F1 is a separation force between the first mold member and the first surface and F2 is a separation force between the second mold member and the second surface.

As a fifth aspect of the present invention, the following molding method is provided as a preferable aspect of the above-described molding method of the second aspect. In the molding method, the flange section has a structure so that F1 is larger than F2, where F1 is a separation force between the first mold member and the first surface and F2 is a separation force between the second mold member and the second surface.

As a sixth aspect of the present invention, the following mold is provided as a preferable aspect of the above-described mold of the third aspect. In the mold, the flange section has a structure so that F1 is larger than F2, where F1 is a separation force between the first mold member and the first surface and F2 is a separation force between the second mold member and the second surface.

The terms to be used herein will be described.

An "optical element" has, at least on its one surface, an optical functional section with a fine structure. For example, a lens which has an optical functional section with a fine structure on an object-side surface and an aspherical optical functional section on an image-side surface, and a lens in which, at least on one surface, a flat surface perpendicular to the optical axis has stepwise concentric ring-shape zones about the optical axis as the center can be enumerated.

An "optical functional section" refers to an optical surface which has at least one of a light-incident surface and light-exit surface and has an predetermined optical function.

A "fine structure" refers to a fine uneven shape formed on the optical functional section described above, and includes, e.g., a shape formed of a plurality of ring-shape zones with a fine step, a shape in which a flat surface perpendicular to the optical axis is formed stepwise as concentric ring-shape zones about the optical axis as the center, a shape that causes diffraction, and the like. As examples of such a shape, a fine structure which includes a ring-shape zone structure having a plurality of ring-shape zones, which are concentric of the optical axis of the optical element, the ring-shape zones are continuous through fine steps, and the fine structure has a saw-toothed sectional shape. As another example of the fine structure, a superposed ring-shape zone structure, which includes a ring-shape zone structure having a plurality of ring-shape zones, which are concentric of the optical axis of the optical element and are continuous through fine steps. In the superposed ring-shape zone structure, each of the ring-shape zones has stair-like steps thereon.

The optical element, a method of molding an optical element, and a mold according to the first to sixth aspects have the following effects.

According to the first to third aspects, the flange section has the heat shrinkage-inhibiting portion which inhibits heat shrinkage during molding in a direction perpendicular to the optical axis of the optical element. Even if a slight gap should exist between the mold surface of the male mold of the first mold member, which corresponds to the optical functional section and the optical functional section of the molded product, heat shrinkage of the formed optical functional section is suppressed by the heat shrinkage-inhibiting portion. As a result, when the formed optical functional section is ejected with the mold surface, as the mold surface and the surface shape of the formed optical functional section coincide, the optical functional section formed with the mold surface does not deform. Therefore, when molding an optical element, one, which is free from the problems described in the prior art, can be obtained. In particular, the fine structure of the optical functional section is reproduced with high accuracy.

According to the fourth to sixth aspects, the optical element is molded with the mold having the first mold member which forms the first surface having the optical functional section and the second mold member which forms the second surface opposite to the first surface, and the flange section has such a shape that F1 is larger than F2 where F1 is a separation force between the first mold member and first surface and F2 is a separation force between the second mold member and second surface. After the mold is opened apart into the first mold member (movable mold member) and second mold member (fixed mold member), the molded product (optical element) is stably left in the first mold member, and no gap is formed between that portion of the first mold member which corresponds to the optical functional section and the optical functional section of the molded product. Even if a gap should be formed, it is very small. In particular, when the fourth to sixth aspects are combined with the technique of the first aspect, when molding an optical element, one in which the problems described regarding the prior art problems are more unlikely to occur can be obtained. In particular, the fine structure of the optical functional section is reproduced with higher accuracy.

The above and many objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIGS. 1A to 1C are a front view, optical-axis sectional view, and enlarged optical-axis sectional view of the flange section, respectively, of an optical element according to the first embodiment of the present invention;

FIGS. 5A to 5C are a front view, optical-axis sectional view, and enlarged optical-axis sectional view of the flange section, respectively, of an optical element according to the second embodiment described below;

FIGS. 6A to 6C are a front view, optical-axis sectional view, and enlarged optical-axis sectional view of the flange section, respectively, of an optical element according to the third embodiment described below;

FIG. 9 is a partially sectional view showing a state during molding of the conventional optical element; and FIGS. 10A to 10C and 11A to 11C are schematic views showing a molding process for the fine structure of FIG. 9.

DETAILED DESCRIPTION OF THE INVENTION

Figure 2A:
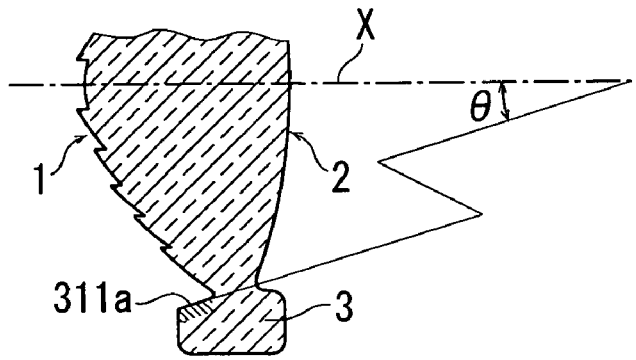
FIGS. 2A to 2D are optical-axis sectional views showing examples of the heat shrinkage-inhibiting portions of the flange sections shown in FIGS. 1A to 1C.

In the first to third aspects, it is preferable that the flange section has a structure in which the periphery of the optical functional section projects to that side of the optical element which has an optical functional surface in a direction of the optical axis of the optical element, the heat shrinkage-inhibiting portion is on an inner side surface of the flange section. Further, an angle formed by the heat shrinkage-inhibiting portion and the optical axis of the optical element is preferably 0° (inclusive) to 25° (inclusive), more preferably 1° (inclusive) to 20° (inclusive), and particularly preferably 10° (inclusive) to 20° (inclusive).

According to the fourth to sixth aspects, it is also preferable that the flange section has a structure in which the periphery of the optical functional section projects to that side of the optical element which has an optical functional surface in a direction of the optical axis of the optical element. Further, an angle formed by an outer side surface of the flange section and the optical axis of the optical element is preferably 0° (inclusive) to 5° (inclusive), and more preferably 0° (inclusive) to 3° (inclusive). With this structure, after the mold is opened apart into the first mold member (movable mold member) and second mold member (fixed mold member), the molded product (optical element) is stably left in the first mold member, and no gap is formed between that portion of the first mold member which corresponds to the optical functional section and the optical functional section of the molded product.

In the present invention, it is preferable that the fine structure includes a ring-shape zone structure having a plurality of ring-shape zones, which are continuous through fine steps. According to one of further preferable aspects, the fine structure includes a ring-shape zone structure having a plurality of ring-shape zones, which are concentric of the optical axis of the optical element and are continuous through fine steps, and the ring-shape zone structure has a saw-toothed sectional shape. According to another preferable aspect, the fine structure includes a ring-shape zone structure having a plurality of ring-shape zones, which are concentric of the optical axis of the optical element and are continuous through fine steps, and the fine structure is a superposed ring-shape zone structure having stair-like steps on the respective ring-shape zones.

The present invention is applied particularly suitably when the optical element has a fine structure on each of its two surfaces.

PREFERRED EMBODIMENTS OF THE INVENTION

Several preferred embodiments concerning an optical element, a molding method and mold will be described with reference to the accompanying drawings.

First Embodiment

First, an optical element according to the first embodiment of the present invention will be described with reference to the accompanying drawings.

FIGS. 1A to 1C are a front view, optical-axis sectional view, and enlarged optical-axis sectional view of the flange section, respectively, of an optical element according to the first embodiment of the present invention. FIGS. 2A to 2D are optical-axis sectional views showing an example of the heat shrinkage-inhibiting portion of the flange section shown in FIG. 1C.

Referring to FIGS. 1A to 1C and 2A to 2D, an optical element 10A is a single lens having a positive power, and includes an object-side surface 1 formed with an optical functional section 1a having a fine structure 11a, an image-side surface 2 having an aspherical optical functional section, and a flange section 3 formed around the periphery of the optical functional section. In FIG. 1C, reference symbol PL denotes the parting line of molding.

The optical element 10A is a molded product. The object-side surface 1 of the optical element 10A is formed with the movable mold member of a mold, and its image-side surface 2 is formed with the fixed mold member of the mold.

The flange section 3 has, on its object-side surface 1 side, a heat shrinkage-inhibiting portion 31a, which prevents heat shrinkage during molding. An example of the heat shrinkage-inhibiting portion will be described. The surface of a heat shrinkage-inhibiting portion 311a shown in FIG. 2A is inclined at an angle of θ with respect to an optical axis X. When an angle from 0° to 25° is selected as the angle θ, a heat shrinkage-inhibiting effect can be particularly obtained.

If the angle θ is lower than its lower limit, since it becomes a negative value (minus), a molded product (optical element 10A) may not be extracted from the movable mold. If the angle θ exceeds its upper limit, since the heat shrinkage-inhibiting portion 311a slides on a projection K (see FIG. 4B) of a male mold 622a during heat shrinkage, shrinkage in a direction perpendicular to the optical axis cannot be inhibited. When a gap is formed between the object-side surface 1 of the optical element 10A and a mold surface 6221a of the male mold 622a (see FIGS. 4A and 4B) as the movable mold member, if the heat shrinkage-inhibiting portion 311a separates from the male mold, even if slightly, the heat shrinkage-inhibiting portion 311a is to shrink in the direction perpendicular to the optical axis. This is not preferable. The angle θ is preferably 1° to 20°, and more preferably 10° to 20°.

The heat shrinkage-inhibiting portion 311a shown in FIG. 2A prevents heat shrinkage of the optical functional section 1a in the direction perpendicular to the optical axis X when the molded product (optical element 10A) is being cooled in the mold during molding. More specifically, the heat shrinkage-inhibiting portion 311a inhibits shrinkage of the molded product in the direction perpendicular to the optical axis of the optical element by means of the projection K (see FIG. 4B) of the male mold 622a as the movable mold, so that the molded product cannot deform.

Figure 2B:
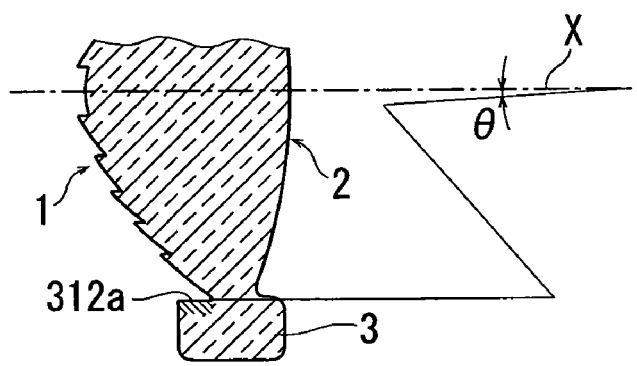
Figure 2C:
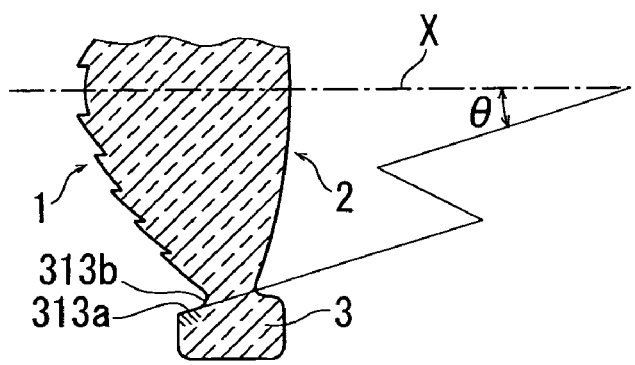
Figure 2D:
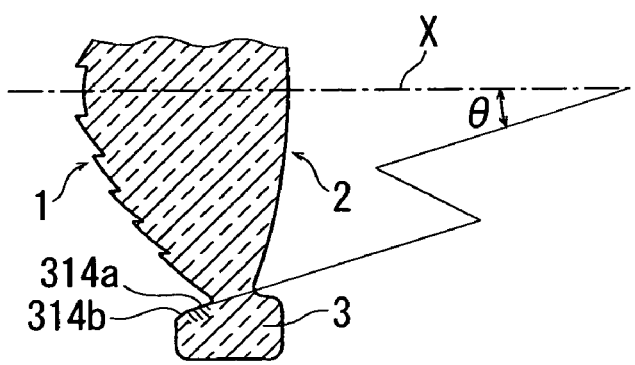

The surface of a heat shrinkage-inhibiting portion 312a shown in FIG. 2B is substantially parallel to an optical axis X. Accordingly, even if the mold surface 6221a (see FIG. 4A) and a flange section 3 shift from each other in a direction parallel to the optical axis, the heat shrinkage-inhibiting portion 312a can inhibit shrinkage of the molded product in a direction perpendicular to the optical axis. A heat shrinkage-inhibiting portion 313a shown in FIG. 2C has such a shape that can provide the same effect as that of FIG. 2A and that can improve the flow of the melted material during molding with an inclined surface 313b. A heat shrinkage-inhibiting portion 314a shown in FIG. 2D has such a shape that can provide the same effect as that of FIG. 2A and that can improve the flow of the melted material during molding with an inclined surface 314b.

Figure 3:
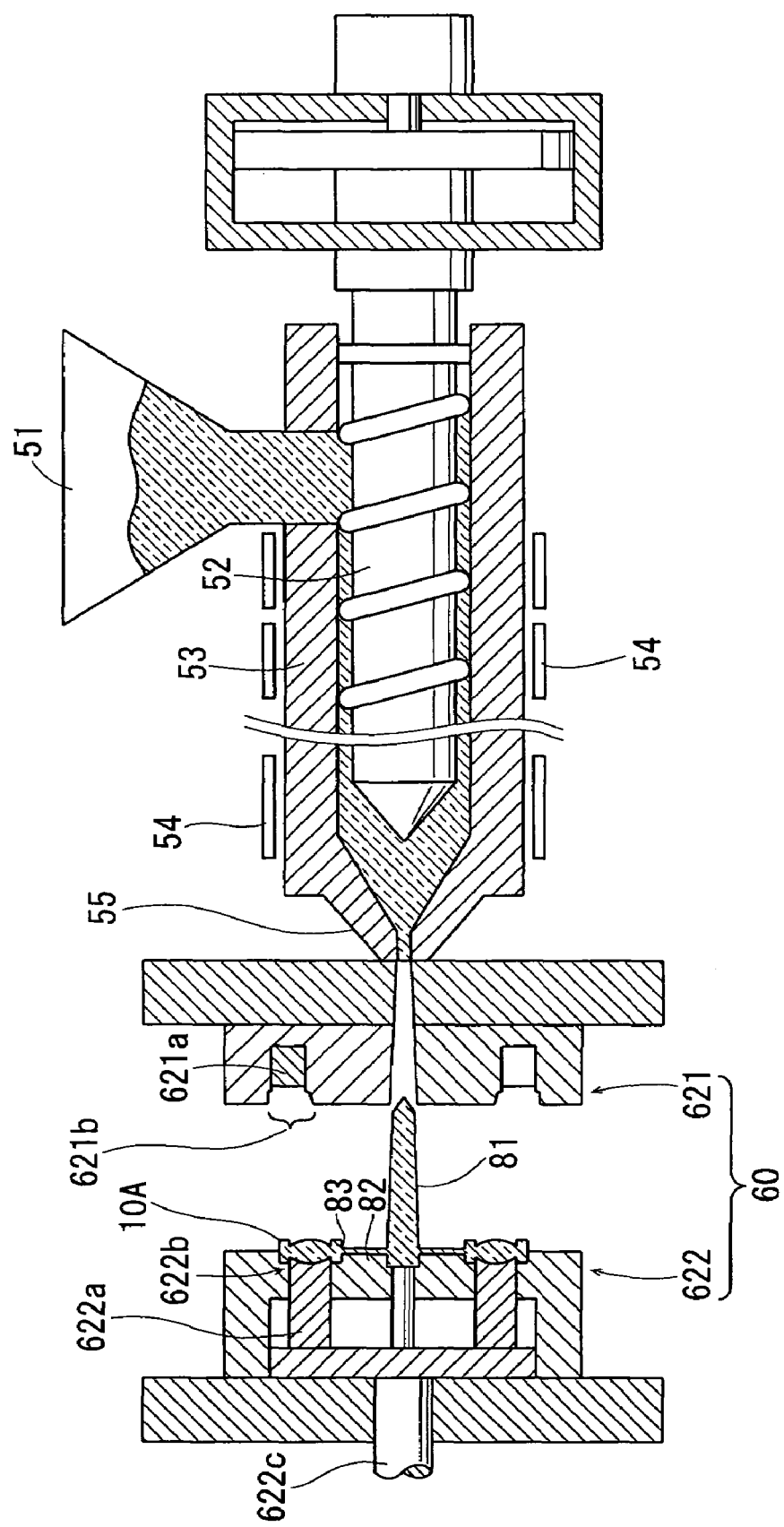
FIG. 3 is a sectional view showing the schematic structure of a molding machine, which molds an inventive optical element.

Molding of the optical element 10A will be described. FIG. 3 is a sectional view showing the schematic structure of a molding machine which molds an optical element of the present invention, and FIGS. 4A and 4B are views showing a state before mold opening and a state during ejecting a molded product, respectively, in a molding process.

Figure 4A:
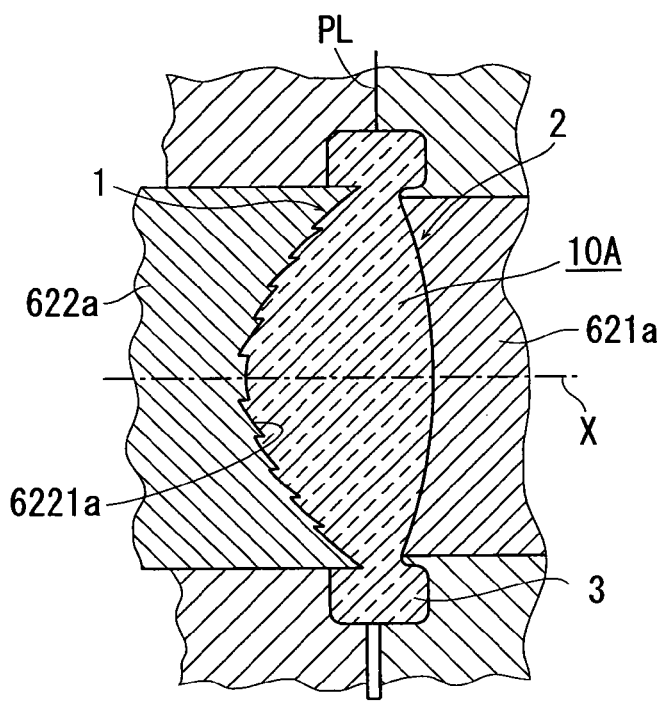
FIGS. 4A and 4B are views showing a state before mold opening and a state during ejecting a molded product, respectively, in a molding process.
Figure 4B:
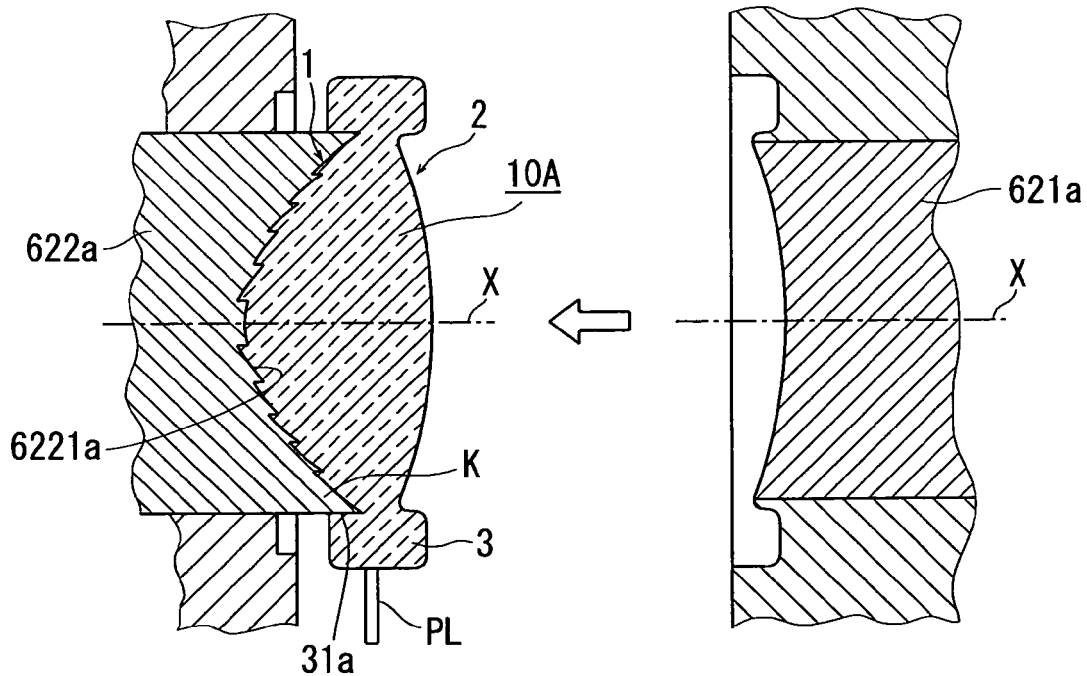
Figure 7A:
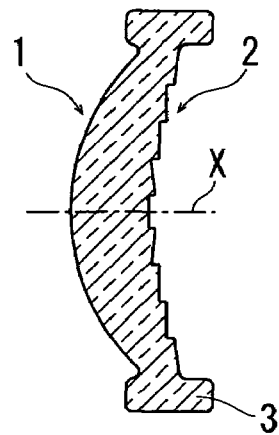
FIGS. 7A to 7E are schematic optical-axis sectional views of other inventive optical elements.
Figure 7D:
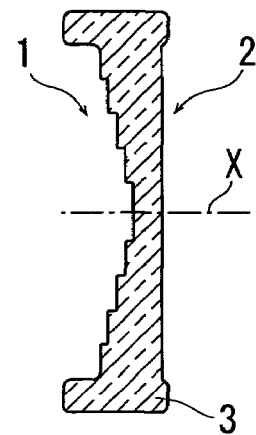
Figure 7B:
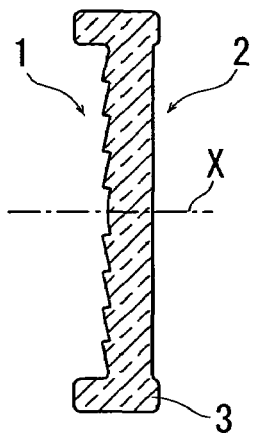
Figure 7E:
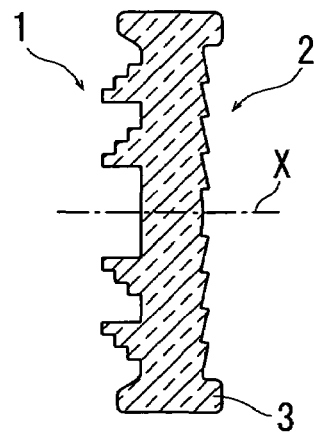
Figure 7C:
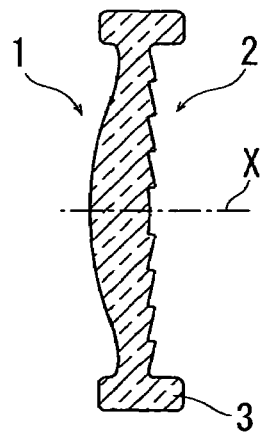
Figure 8A:
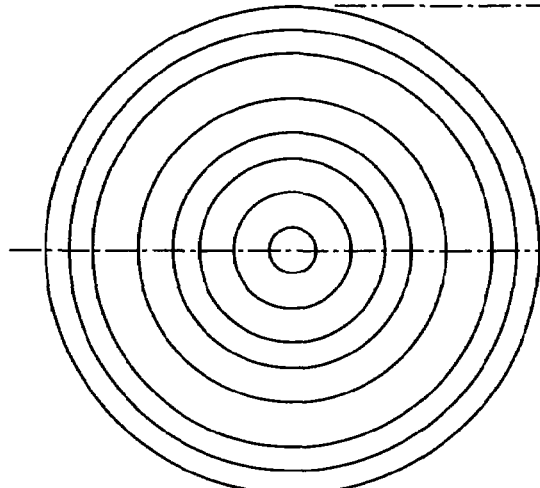
FIGS. 8A to 8C are a front view, optical-axis sectional view, and enlarged optical-axis sectional view of the flange section, respectively, of a conventional optical element.
Figure 8B:
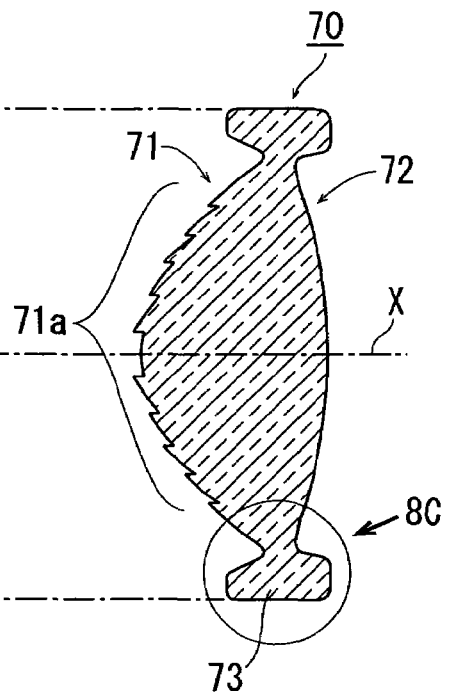
Figure 8C:
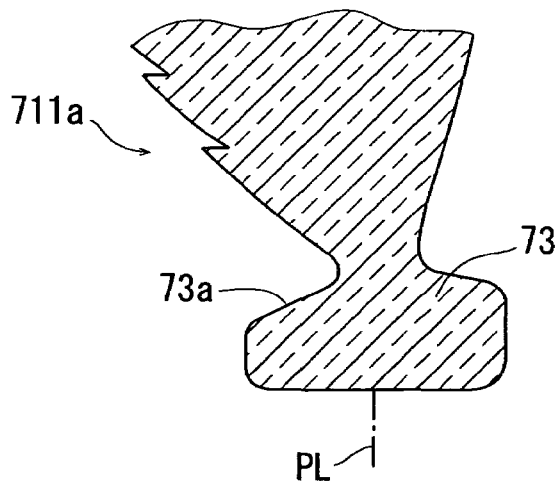

Referring to FIGS. 3 and 4A and 4B, the molding machine includes a hopper 51, screw 52, cylinder 53, heater 54, nozzle 55, mold 60, and the like. The mold 60 is divided into a fixed mold member 621 and movable mold member 622. The fixed mold member 621 has a female mold 621a and fixed mold member shaping portion 621b. The movable mold member 622 has a male mold 622a, a movable mold member shaping portion 622b, an ejecting portion 622c.

According to the molding process for the optical element 10A, first, a plastic material is put in the hopper 51, and is conveyed toward the nozzle 55 with the screw 52. During conveyance, the material is fused with the heater 54 arranged around the cylinder 53. The melted plastic material is poured into a runner 82, gate 83, and cavity of the mold 60 through the nozzle 55 and a sprue 81, and is pressurized to form a molded product (optical element 10A) (see FIG. 4A). After the molded product solidifies, the mold 60 is opened apart into the movable mold member 622 and fixed mold member 621. The molded product is left in the movable mold member 622.

The surface of the heat shrinkage-inhibiting portion 31a (311a to 314a in FIGS. 2A to 2D) forms an angle of 0° to 25° with respect to the optical axis X. When the molded product is being cooled in the mold, its shrinkage in a direction perpendicular to the optical axis is inhibited by the cooperation of the heat shrinkage-inhibiting portion 311a and the projection K of the male mold 622a, so that the molded product will not deform. After that, the molded product is ejected with the male mold 622a and extracted, thus completing the molded product.

As described above, even when a slight gap is formed between the molded product and movable mold member, heat shrinkage of the formed optical functional section in the movable mold member side is suppressed with the heat shrinkage-inhibiting portion. Even if the molded product is ejected with that mold surface of the movable mold member, which corresponds to the formed optical functional section, as the mold surface and the surface shape of the formed optical functional section coincide with each other, the optical functional section formed with the mold surface does not deform. Consequently, the fine structure of the optical functional section can be formed with high accuracy.

Second Embodiment

An optical element according to the second embodiment will be described with reference to the accompanying drawings. FIGS. 5A to 5C are a front view, optical-axis sectional view, and enlarged optical-axis sectional view of the flange section, respectively, of the optical element according to the second embodiment of the present invention.

Referring to FIGS. 5A to 5C, an optical element 10B is a single lens having a positive power, and includes an object-side surface 1 having an optical functional section with a fine structure, an image-side surface 2 having an aspherical optical functional section, and a flange section 3 formed on the periphery. The optical element 10B is a molded product. The object-side surface 1 of the optical element 10B is formed with the movable mold member of a mold, and its image-side surface 2 is formed with the fixed mold member of the mold. In FIG. 5C, reference symbol PL denotes the parting line of molding.

A force (separation force) with which a flange section (32a of FIG. 5C) formed with the movable mold member is released from the movable mold member, and a force (separation force) with which a flange section (see 32b of FIG. 5C) formed with the fixed mold member is released from the fixed mold member will be described.

Assume that a force with which that portion (the optical functional section of the object-side surface and the flange section) of the optical element 10B which is formed with the movable mold member is released from a movable mold member shaping portion 622b is determined as F1, and that a force with which that portion (the optical functional section of the image-side surface and the flange section) of the optical element 10B which is formed with the fixed mold member is released from a fixed mold member shaping portion 621b is determined as F2. Also, assume that a force with which the flange section (see 32a of FIG. 5C) formed with the movable mold member is released from the movable mold member shaping portion 622b is determined as F1, and that a force with which the flange section (see 32b of FIG. 5C) formed with the fixed mold member is released from the fixed mold member shaping portion 621b is determined as F2. The separation forces F1 and F2 are designed such that F1 is larger than F2.

This will be exemplified in more detail with the optical element 10B shown in FIGS. 5A to 5C. The shape of that portion 32a of the flange section 3, which is to be formed with the movable mold member, is changed to obtain the predetermined separation force F1. Similarly, the shape of that portion 32b of the flange section 3, which is to be formed with the fixed mold member, is changed to obtain the predetermined separation force F2.

For simplifying the description, a case will be described wherein the force with which the optical functional section of the optical element 10B which is formed with the movable mold member is released from the movable mold member and the force with which the optical functional section of the optical element 10B which is formed with the fixed mold member is released from the fixed mold member are equal. In this case, of that portion 32a of the flange section 3 which is formed with the movable mold member, the contact area with the movable mold member is increased, and the surface almost parallel to the optical axis X is increased, so that the portion 32a does not easily separate from the movable mold member. Thus, the predetermined separation force F1 becomes large. Of that portion 32b of the flange section 3 which is formed with the fixed mold member, the contact area with the fixed mold member is decreased, and the surface almost perpendicular to the optical axis X is increased, so that the portion 32b easily separates from the fixed mold member. Thus, the separation force F2 becomes smaller than the separation force F1. When the separation force F1 is set to be larger than the separation force F2 in this manner, the separation forces F1 and F2 described above can be set such that F1 is larger than F2. Consequently, when the molded product (optical element 10B) is to be extracted, it can be in tight contact with the movable mold member.

As described above, in molding the optical element, when the mold is opened apart into the movable mold member and fixed mold member, the molded product can be left in tight contact with the movable mold member. When the molded product is ejected with the mold surface, it can be extracted without deforming its optical functional section. Even if a gap is formed between the movable mold member and molded product, it is much smaller than in a conventional case. Thus, the molded product is reliably pushed out through the mold surface, and the molding accuracy of the optical functional section is improved.

Third Embodiment

An optical element according to the third embodiment will be described with reference to the accompanying drawings. FIGS. 6A to 6C are a front view, optical-axis sectional view, and enlarged optical-axis sectional view of the flange section, respectively, of the optical element according to the third embodiment. In the optical element of the third embodiment, the functions of the first and second embodiments are combined to obtain a synergetic effect. A description will be made mainly on portions that are different from their counterparts of the first and second embodiments.

Referring to FIGS. 6A to 6C, an optical element 10C is a single lens having a positive power, and includes an object-side surface 1 having an optical functional section with a fine structure, an image-side surface 2 having an aspherical optical functional section, and a flange section 3 formed on the periphery. The optical element 10C is a molded product. The object-side surface 1 of the optical element 10C is formed with the movable mold member of a mold, and its image-side surface 2 is formed with the fixed mold member of the mold.

The object-side surface 1 of the flange section 3 has a heat shrinkage-inhibiting portion 31a to prevent heat shrinkage during molding. The heat shrinkage-inhibiting portion 31a is substantially parallel to an optical axis X.

Assume that a force with which that portion of the optical element 10C which is formed with the movable mold member is released from a movable mold member shaping portion 622b is determined as F1, and that a force with which that portion of the optical element 10C which is formed with the fixed mold member is released from a fixed mold member shaping portion 621b is determined as F2. The shape of that portion 32a of the flange section 3, which is to be formed with the movable mold member, is changed, and the shape of that portion 32b of the flange section 3, which is to be formed with the fixed mold member, is changed, so that F1 is larger than F2. Note that F1 is the minimal value of the tolerance of the separation force, and that F2 is the maximal value of the tolerance of the separation force.

The third embodiment exemplifies a case with reference to FIGS. 6A to 6C wherein the separation force of the object-side surface 1 at the optical functional section and that of the image-side surface 2 at the optical functional section are equal. In this case, of that portion 32a of the flange section 3 which is formed with the movable mold member, the contact area with the movable mold member is increased, and the surface almost parallel to the optical axis X is increased, so that the portion 32a does not easily separate from the movable mold member. Of that portion 32b of the flange section 3 which is formed with the fixed mold member, the contact area with the fixed mold member is decreased, and the surface almost perpendicular to the optical axis X is increased, so that the portion 32b easily separates from the fixed mold member.

Hence, after the optical element is molded and solidified, in the process of opening the mold apart into the movable mold member and fixed mold member, the molded product can be left in tight contact with the movable mold member. Even if the molded product is slightly separate from the movable mold member, the separation amount can be decreased considerably. Even if a slight gap is formed between the molded product and movable mold member, as the mold surface and the surface shape of the thermally shrunk optical functional section coincide, when the molded product is ejected with the mold surface, the thermally shrunk optical functional section is not deformed by the mold surface. Thus, the molding accuracy of the fine structure of the optical functional section becomes particularly good.

The optical element of the present invention is not limited to the first to third embodiments described above, but includes other examples as follows. FIGS. 7A to 7E are schematic optical-axis sectional views of other optical elements according to the present invention. In the optical element shown in FIG. 7A, an image-side surface 2 is formed with a movable mold member, and a concave optical functional section has a fine structure with ring bands about an optical axis X as the center. In the optical element shown in FIG. 7B, an object-side surface 1 is formed with a movable mold, and a flat optical functional section has a fine structure with ring bands about an optical axis X as the center. In the optical element shown in FIG. 7C, an image-side surface 2 is formed with a movable mold member, and a flat optical functional section has a fine structure with ring bands about an optical axis X as the center. In the optical element shown in FIG. 7D, an object-side surface 1 is formed with a movable mold member, and a concave optical functional section has a fine structure with stepped ring bands about an optical axis X as the center. In the optical element shown in FIG. 7E, an object-side surface 1 is formed with a movable mold member, and a flat optical functional section has a fine structure with stepped ring bands about an optical axis X as the center.

EFFECT OF THE INVENTION

According to the present invention, the flange section has a heat shrinkage-inhibiting portion, which inhibits heat shrinkage during molding in a direction perpendicular to the optical axis of the optical element. Even if a slight gap should exist between the mold surface of the male mold of the first mold member (movable mold member), which corresponds to the optical functional section and the optical functional section of the molded product, heat shrinkage of the formed optical functional section is suppressed by the heat shrinkage-inhibiting portion. As a result, when the formed optical functional section is ejected with the mold surface, as the mold surface and the surface shape of the formed optical functional section coincide, the optical functional section formed with the mold surface does not deform. Therefore, when molding an optical element, one which is free from problems such as deformation can be obtained. In particular, the fine structure of the optical functional section is reproduced with high accuracy.

What is claimed is:

1. An optical element manufactured with a mold in a molding process, comprising:
   an optical functional section on a first surface of the optical element, the optical functional section having a fine structure; and
   a flange section formed around a periphery of the optical functional section,
   wherein the flange section has a heat shrinkage-inhibiting portion adapted to engage the mold to inhibit heat shrinkage of the optical element during the molding process in a direction perpendicular to an optical axis of the optical element, and
   wherein the heat shrinkage-inhibiting portion is an inner side surface of the flange section, and an angle formed by the heat shrinkage-inhibiting portion and the optical axis of the optical element is 0° (inclusive) to 25° (inclusive).

2. The optical element of claim 1, wherein the flange section has a structure in which the periphery of the optical functional section projects to a first surface side of the optical element in a direction of the optical axis of the optical element.

3. The optical element of claim 1, wherein the angle formed by the heat shrinkage-inhibiting portion and the optical axis of the optical element is 10° (inclusive) to 20° (inclusive).

4. The optical element of claim 1, wherein the optical element is molded with a mold including a first mold member, which forms the first surface of the optical element, and a second mold member, which forms a second surface opposite to the first surface, and
   wherein the flange section has a first structure so that F1 is larger than F2, where F1 is a separation force between the first mold member and the first surface and F2 is a separation force between the second mold member and the second surface.

5. The optical element of claim 4, wherein the flange section has a second structure in which the periphery of the optical functional section projects to a first surface side of the optical element in a direction of the optical axis of the optical element, and
   wherein an angle formed by an outer side surface of the flange section and the optical axis of the optical element is 0° (inclusive) to 5° (inclusive).

6. The optical element of claim 5, wherein the angle formed by the outer side surface of the flange section and the optical axis of the optical element is 0° (inclusive) to 3° (inclusive).

7. The optical element of claim 1, wherein the fine structure includes a ring-shape zone structure having a plurality of ring-shape zones, which are continuous through fine steps.

8. The optical element of claim 7, wherein the fine structure includes a ring-shape zone structure having a plurality of ring-shape zones, which are concentric of the optical axis of the optical element and are continuous through fine steps, and
   wherein the ring-shape zone structure has a saw-toothed sectional shape.

9. The optical element of claim 7, wherein the fine structure includes a ring-shape zone structure having a plurality of ring-shape zones, which are concentric of the optical axis of the optical element and are continuous through fine steps, and wherein the fine structure is a superposed ring-shape zone structure having stair-like steps on the respective ring-shape zones.

10. An optical element of claim 1, wherein the optical element has fine structures on the first surface of the optical element and a second surface, which is opposite to the first surface.

* * * * *